United States Patent

Zschetzsche

Patent Number: 6,156,262
Date of Patent: Dec. 5, 2000

[54] MELTER GASIFIER FOR THE PRODUCTION OF A METAL MELT

[75] Inventor: Albert Zschetzsche, Linz, Austria

[73] Assignees: Voest-Alpine Industrieanlagenbau GmbH, Linz, Austria; Pohang Iron & Steel Co., Ltd., Sang Book-Do; Research Institute of Industrial Science & Technology, Incorporated Foundation, Pohang, both of Rep. of Korea

[21] Appl. No.: 09/217,482

[22] Filed: Dec. 21, 1998

Related U.S. Application Data

[63] Continuation-in-part of application No. PCT/AT97/00133, Jun. 19, 1997.

[30] Foreign Application Priority Data

Jun. 20, 1996 [AT] Austria ................................ A 1100/96

[51] Int. Cl.$^7$ ...................................................... C22B 1/10
[52] U.S. Cl. ............................................ 266/172; 266/170
[58] Field of Search ................................. 266/170, 172; 75/445, 453

[56] References Cited

U.S. PATENT DOCUMENTS

| | | | |
|---|---|---|---|
| 5,259,865 | 11/1993 | Greenwalt | 75/445 |
| 5,535,991 | 7/1996 | Kepplinger et al. | 266/172 |
| 5,785,733 | 7/1998 | Lee et al. | 266/172 |
| 5,944,871 | 8/1999 | Nagl | 75/445 |
| 5,989,309 | 11/1999 | Joo et al. | 75/453 |

FOREIGN PATENT DOCUMENTS

| | | |
|---|---|---|
| 0010627 | 5/1980 | European Pat. Off. . |
| 0111176 | 6/1984 | European Pat. Off. . |
| 0217331 | 4/1987 | European Pat. Off. . |
| 0576414 | 12/1993 | European Pat. Off. . |
| 0594557 | 4/1994 | European Pat. Off. . |
| 1154817 | 9/1963 | Germany . |
| 1090826 | 11/1967 | United Kingdom . |

*Primary Examiner*—Scott Kastler
*Attorney, Agent, or Firm*—Ostrolenk, Faber, Gerb & Soffen, LLP

[57] ABSTRACT

A melter gasifier (10) for the production of a metal melt and of a reducing gas is provided with feed ducts (17, 16, 9) for oxygen-containing gases, carbon carriers and the metal carriers. From the melter gasifier (10) there departs at least one gas discharge duct (12) for reducing gas generated in the melter gasifier (10). Also, a tap (18) for the metal melt and for slag is provided. To be able to process fine-particulate metal carriers without the need of briquetting and without entrainment of the supplied fine-particulate metal carriers out of the melter gasifier (10) by the reducing gas generated therein, at least one feed duct (9) feeding the metal carriers is arranged in the region of a dome (30) terminating the melter gasifier (10) toward the top, and in the interior of the melter gasifier (10) below the entry site of the feed duct (9) for the metal carriers a refractory slanting wall (33) inclined towards the vertical line, on which there impinge the metal carriers sinking downward due to gravitational forces. Further, above the slanting wall (33) a heating means (38) is provided by which the area between the entry site of the feed duct (9) for the metal carriers and the slanting wall (33) may be heated.

9 Claims, 2 Drawing Sheets

MELTER GASIFIER FOR THE PRODUCTION OF A METAL MELT

CROSS-REFERENCE TO RELATED APPLICATIONS

This is a continuation-in-part of International Application PCT/AT97/00133, with an International filing date of Jun. 19, 1997.

BACKGROUND OF THE INVENTION

The invention relates to a melter gasifier for the production of a metal melt, preferably a pig iron melt, from metal carriers, in particular sponge iron, which are at least partially reduced and contain a portion of fines, and of a reducing gas by gasification of coal, with feed ducts for oxygen-containing gases, carbon carriers and the metal carriers running into said melter gasifier, which feed ducts for oxygen-containing gases are arranged in the lower region of the melter gasifier, wherein at least one gas discharge duct for reducing gas generated in the melter gasifier departs from the melter gasifier and the melter gasifier is provided with a tap for the metal melt and for slag.

From EP-B - 0 010 627 it is known to feed in particulate iron-containing material, such as pre-reduced sponge iron, through a centrally arranged charging opening in the hood of the melter gasifier from above, with the particles dropping into the melter gasifier by the effect of gravity and being slowed down in the fluidized bed existing within the melter gasifier. Coal in lumpy form is charged through a charging opening arranged laterally in the hood of the melter gasifier or in the dome terminating the melter gasifier toward the top, also under the influence of gravity. The reducing gas formed in the melter gasifier is withdrawn through the centrally arranged charging opening for the iron-containing material.

A process of this kind is not suitable for processing fine-particle metal carriers, in particular fine-particle sponge iron, since the fine-particle metal carriers due to the pronounced gas flow of the reducing gas formed in the melt-down gasifying zone and withdrawn through the central charging opening arranged in the hood or in the dome of the melter gasifier would be instantly carried out of the melter gasifier. Such a discharge of the fine-particle metal carriers is further favored by the temperature reigning in the upper region of the melter gasifier, i.e. in the region above the melt-down gasifying zone, which is too low to ensure a melt-down, i.e. agglomeration of the fine particles at the charging site to form bigger particles which in spite of the ascending gas stream could sink down into the melt-down gasifying zone.

From EP-A - 0 271 331 it is known to introduce pre-reduced fine ore into a melter gasifier and to completely reduce and melt it by means of a plasma burner while supplying a carbon-containing reducing agent. The pre-reduced fine ore or the sponge-iron powder respectively is fed to a plasma burner provided in the lower section of the melter gasifier. A disadvantage of this method is that by supplying the pre-reduced fine ore directly in the lower meltdown region, i.e. in the region where the melt collects, complete reduction can no longer be ensured and the chemical composition necessary for further processing the pig iron cannot be achieved by any means. Moreover, the charging of major amounts of pre-reduced fine ore is not feasible due to fluidized bed or the fixed bed forming from coal in the lower region of the melter gasifier, as it is not possible to carry off a sufficient quantity of the melting products from the high-temperature zone of the plasma burner. The charging of major amounts of pre-reduced fine ore would lead to instant thermal and mechanical failure of the plasma burner.

From EP-B - 0 111 176 it is known to feed a fine grain fraction of sponge iron particles into the melter gasifier through a downpipe projecting from the head of the melter gasifier into the proximity of the coal fluidized bed. At the end of the downpipe a baffle plate is provided for minimizing the velocity of the fine grain fraction, resulting in a very low exit velocity of the fine grain fraction from the downpipe. At the charging site, the temperature reigning in the melter gasifier is very low, whereby immediate melting of the supplied fine grain fraction is prevented. This and the low exit velocity from the downpipe cause a substantial portion of the supplied fine grain fraction to be carried out of the melter gasifier again together with the reducing gas generated in the same. The charging of a major amount of sponge iron particles containing a fine portion or of only a fine grain fraction is not feasible in accordance with this method.

From EP-A - 0 594 557 it is known to charge a fine grain fraction of sponge iron by means of a conveying gas directly into the fluidized bed formed by the melt-down gasifying zone in the melter gasifier. However, this is disadvantageous, since hereby the gas circulation of the fluidized bed may be disturbed because obstructions of the fluidized bed, which acts like a filter, may ensue as a consequence of the fine grain fraction that is blown directly into the fluidized bed. As a result, eruptive outbreaks of gas may occur which will break up the clogged fluidized bed. Hereby, the gasification process for the carbon carriers and also the melt-down process for the reduced iron ore are markedly disturbed.

From EP-A - 0 576 414 it is known to feed fine-particle metal carriers into the melt-down gasifying zone via dust burners. This method exhibits a poor melt-in performance, which is due to the short dwelling time of the particles in the hot flame.

DE-B - 11 54 817 describes a method in which finely ground iron ore and fluxing agents as well as fuel and oxygen and/or air are introduced into a reaction chamber via a burner. In this method, a strongly oxidizing burner flame is generated first of all and the participants in the reaction are heated until they melt. Subsequently, fuel is blown onto the flame for further reduction work. The flame is directed onto a melt present in the melting chamber.

SUMMARY OF THE INVENTION

The invention aims at avoiding the above-mentioned disadvantages and difficulties and has as its object to provide a melter gasifier of the kind initially described, which permits processing of fine-particulate metal carriers without the need of briquetting, and wherein, on the one hand, discharge of the supplied fine particles, possibly in the pre-reduced or in the completely reduced state, by the reducing gas generated in the melter gasifier is reliably avoided and on the other hand, if necessary, a final reduction of the fine particles is ensured. A further object to be achieved in accordance with the invention is to achieve a distribution as uniform as possible of the metal carriers and the carbon carriers in the fluidized bed of the melt-down gasifying zone.

In accordance with the invention, this object is achieved in that at least one feed duct feeding the metal carriers is arranged in the region, preferably the central region, of a dome terminating the melter gasifier toward the top and that in the interior of the melter gasifier below the entry site of the feed duct for the metal carriers a refractory slanting wall is arranged that is inclined towards the vertical line and on which there impinge the metal carriers sinking downward due to gravitational forces, and that above the slanting wall a heating means, preferably a coal burner, is provided by which the area between the entry site of the feed duct for the metal carriers and the slanting wall may be heated.

Hereby, the metal carriers drop onto the inclined slanting wall and slide along the same. By the heating means, the region between the slanting wall and the dome of the melter gasifier is maintained above the melting temperature of the metal carriers, and the metal carriers, which are slowed down by impinging on or sliding along the slanting wall respectively, may partially melt and agglomerate. In spite of the pronounced reducing-gas stream exiting the melter gasifier in the region of the dome, the agglomerates thus formed sink down to the melt-down gasifying zone formed by a fluidized bed and travel through the same, wherein they are completely melted. Discharging of the fine-particulate metal carriers from the melter gasifier is avoided effectively.

In accordance with a preferred embodiment, the slanting wall is constructed as an enveloping wall of a truncated cone or pyramid having an apex that is directed downward, and several feed ducts for the metal carriers are provided in the dome of the melter gasifier, all of them being arranged in the region located vertically above the enveloping wall and being directed towards the inner surface of the enveloping wall. Here, the enveloping wall encloses a space that can be regarded as a combustion chamber. It is spatially separated from the rest of the clear space of the melter gasifier, whereby the energy supplied for the partial melting or agglomeration respectively of the metal carriers can be minimized.

Further, to produce a uniform temperature in the combustion chamber thus formed, preferably, several heating means are provided above the enveloping wall, wherein suitably the heating means are provided between the outlets of the feed ducts for the metal carriers and the region where the enveloping wall departs at the dome of the melter gasifier.

For charging lumpy coal, preferably a feed duct is provided centrally in the region of the dome and is arranged above the lower opening of the enveloping wall. Hereby it is feasible to optimize the structure of the fluidized bed in the center of the melter gasifier, wherein suitably, in addition, further feed ducts for lumpy carbon carriers and optionally for pre-reduced iron carriers are provided outside of the region located vertically above the enveloping wall.

The invention is particularly suited to a plant for the production of metal melts, particularly pig iron, from charging substances formed of ore, in particular iron ore, and of fluxes and at least partially containing a portion of fines, which is characterized by at least two fluidized bed reactors subsequently connected in series, wherein the ore is conducted from fluidized bed reactor to fluidized bed reactor via conveying ducts in one direction and reducing gas is conducted from fluidized bed reactor to fluidized bed reactor via reducing-gas connecting ducts in the opposite direction, and by a melter gasifier into which there runs a feed duct conducting the reduction product from the fluidized bed reactor arranged last in the direction of the ore flow and the gas discharge duct of which runs into the fluidized bed reactor arranged last in the direction of the ore flow.

DESCRIPTION OF PREFERRED EMBODIMENT

Figure 1:
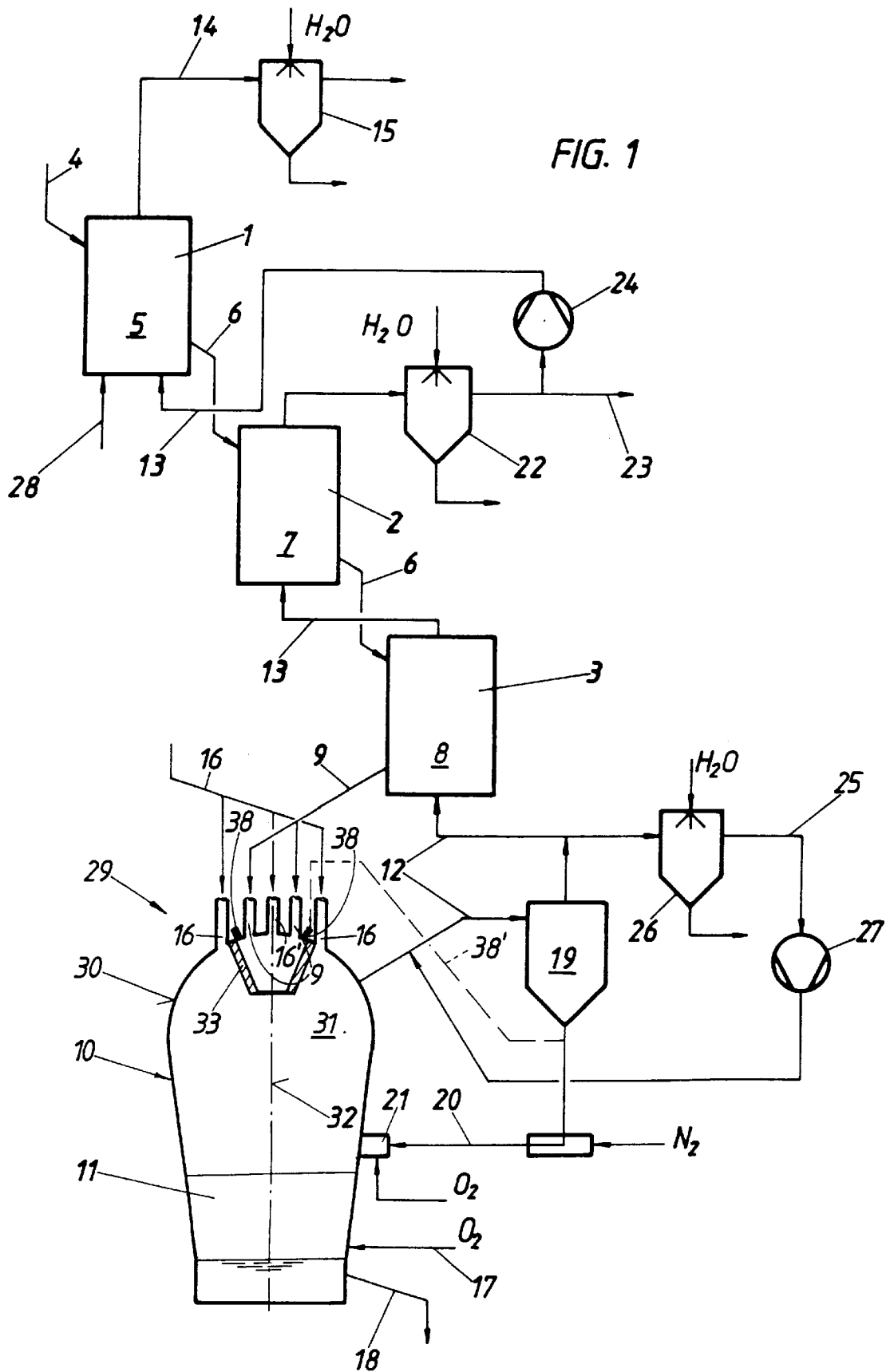
FIG. 1 schematically illustrates an exemplary embodiment of a plant for the production of metal melts in accordance with the invention.

The plant according to FIG. 1 is provided with three fluidized-bed reactors 1 to 3 subsequently connected in series, wherein an iron-oxide-containing material, such as fine ore, of which at least a portion is fine-grain material via an ore feed duct 4 is supplied to the first fluidized-bed reactor 1, in which in a preheating stage 5 preheating of the fine ore and possibly pre-reduction takes place, and subsequently is conducted from fluidized-bed reactor 1 to fluidized-bed reactor 2, 3 via conveying ducts 6. Inside the fluidized-bed reactor 2, pre-reduction is effected in a pre-reduction stage 7 and inside the fluidized-bed reactor 3 in a final reduction stage 8 final or complete reduction respectively, of the fine ore to sponge iron.

The completely reduced material, hence the sponge iron, via a conveying duct 9 is fed into a melter gasifier 10, namely in a specific manner to be described lateron. Inside the melter gasifier 10 in a melt-down gasifying zone 11 formed by a fluidized bed, a CO- and $H_2$-containing reducing gas is generated from carbon carriers, such as coal, and oxygen-containing gas and via the reducing-gas feed duct 12 is fed into the fluidized-bed reactor 3 arranged last with respect to the direction of flow of the fine ore. The reducing gas is then in counterflow to the ore flow conducted from fluidized-bed reactor 3 to fluidized-bed reactor 2 to 1, namely via the connecting ducts 13, is conducted out of the fluidized-bed reactor 1 as a top gas via the top-gas discharge duct 14 and subsequently is cooled and scrubbed in a wet scrubber 15.

The melter gasifier 10 is provided with a feed duct 16 for solid carbon carriers, a feed duct 17 for oxygen-containing gases as well as optionally feed ducts for carbon carriers, such as hydrocarbons, that are liquid or gaseous at room temperature and for calcined fluxes. Inside the melter gasifier 10, below the melt-down gasifying zone 11, molten pig iron or molten steel pre-material respectively and molten slag collect, which are tapped off through a tap 18.

In the reducing-gas feed duct 12 departing from the melter gasifier 10 and running into the fluidized-bed reactor 3, a dedustifying means 19, such as a hot gas cyclone, is provided, the dust particles separated in the cyclone being fed to the melter gasifier 10 via the return duct 20, with nitrogen as the conveying means and passing via burner 21 under the blowing of oxygen.

The fluidized-bed reactor 2, in which the pre-reduction of the fine ore takes place, is supplied with a much smaller amount of reducing gas, which, moreover, has a lower reduction potential, which is, however, quite sufficient for the purpose of pre-reduction. As the degree of reduction of the material to be reduced which is reached here is lower than that in the final reduction stage 8, no "sticking" occurs at this point. The reacted reducing gas exiting the fluidized-bed reactor 2 is supplied to a scrubber 22 via the duct 13. A portion of the scrubbed reacted reducing gas is withdrawn through an export-gas discharge duct 23; another portion is supplied to the preheating stage 5, i.e. the fluidized-bed reactor 1, via the duct 13 via a compressor 24.

A possibility for adjusting the reducing-gas temperature results due to the gas recirculating duct 25, which is preferably provided and which departs from the reducing-gas feed duct 12 and feeds back a portion of the reducing gas via a scrubber 26 and a compressor 27 into said reducing-gas feed duct 12, namely at a position preceding the hot gas cyclone 19.

In order to adjust the preheating temperature of the fine ore it is feasible to supply to the preheating stage 5, hence to the fluidized-bed reactor 1, an oxygen-containing gas, such as air or oxygen, through a duct 28, whereby a partial combustion of the reacted reducing gas supplied to the preheating stage 5 takes place.

Figure 2:
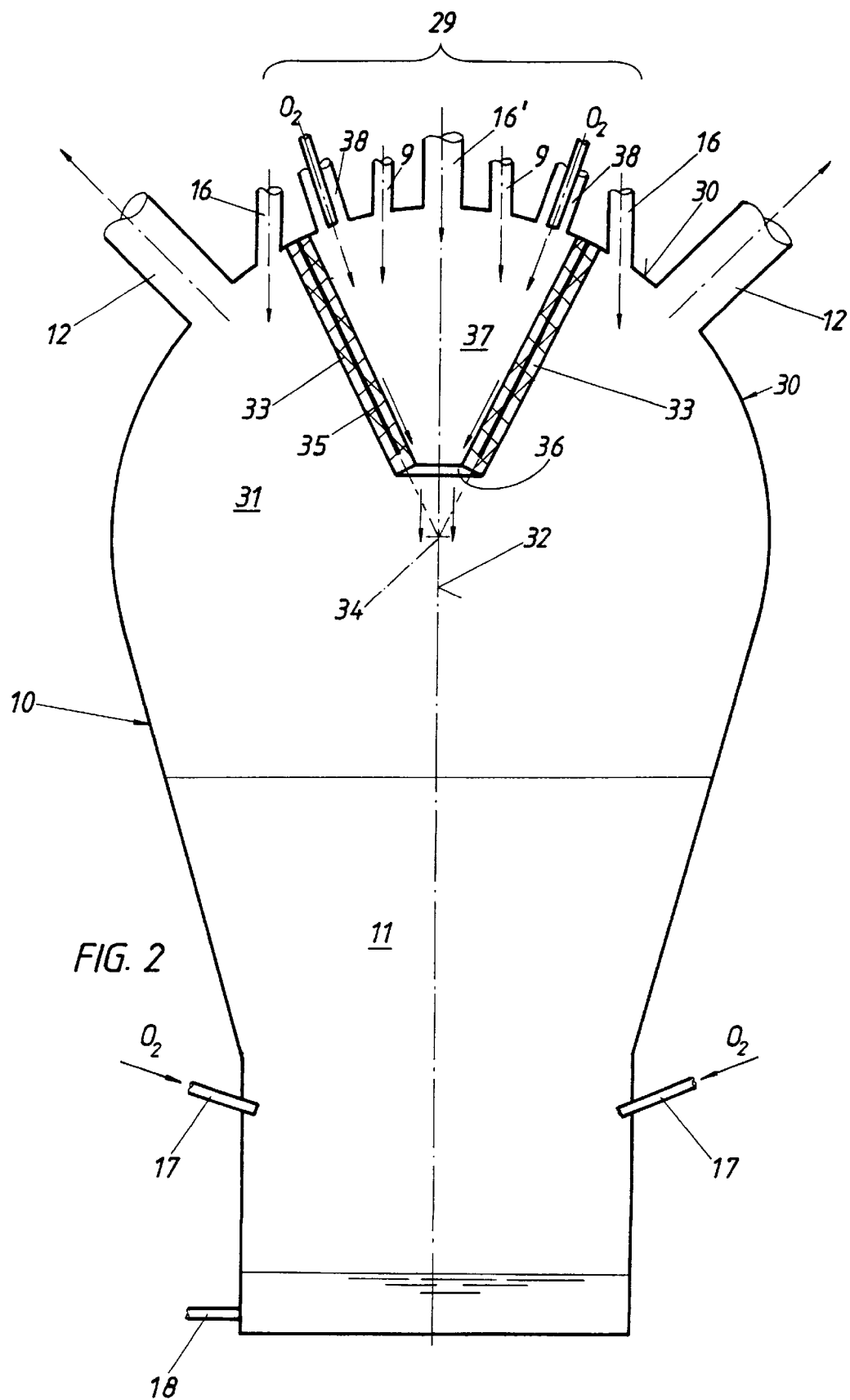
FIG. 2 illustrates a detail of FIG. 1 on an enlarged scale.

In accordance with the invention, charging of the sponge iron and the carbon carriers takes place via a separate charging unit 29, an enlarged view of which is illustrated in FIG. 2.

Centrally in the interior 31 of the dome 30 that terminates the melter gasifier 10 toward the top, the charging unit 29 is provided with a slanting wall 33 arranged so as to be inclined toward the vertical axis 32 of the melter gasifier, said wall in accordance with the preferred exemplary embodiment illustrated being constructed as an enveloping wall of a truncated cone or pyramid. The apex 34 of the truncated cone or pyramid respectively is located on the vertical or longitudinal central axis 32 respectively of the melter gasifier 10. The enveloping wall 33 is made from a refractory material and optionally is interiorly strengthened by means of a supporting structure 35. This supporting structure 35 may be formed by a steel plate jacket.

In the region of the area of the enveloping wall 33 projected onto the dome 30 of the melter gasifier 10 in the direction of the longitudinal central axis 32, feed ducts 9 for the sponge iron run into the melter gasifier 10. The particles of the sponge iron, which via these feed ducts 9 drop downward into the melter gasifier 10 on account of gravity, impinge on the enveloping wall 33 and, as is shown by the arrows, via said enveloping wall 33 flow to the lower opening 36 of the enveloping wall 33 facing the melt-down gasifying zone 11, exit through said opening and sink down to the fluidized bed of the melt-down gasifying zone 11, namely counter to the upward flow of the reducing gas generated in the melter gasifier 10, pass through the melt-down gasifying zone 11 and are melted down.

The region 37 enclosed by the enveloping wall 33 is heated by heating means 38 which are preferably operated as a burner using fine coal and oxygen. The burners 38 maintain the temperature reigning in the region 37 enclosed by the enveloping wall 33, which region can be referred to as a combustion chamber, above the melting temperature of the sponge iron. Hereby, agglomeration and partial melting of the sponge iron particles ensue, so that the bigger particles thus formed from the fine particles reach the fluidized bed of the melt-down gasifying zone in spite of the pronounced countercurrent flow of the reducing gas and cannot be discharged along with the reducing gas.

Also, dust recirculation into the melter gasifier 10 can take place via the burners 38; e.g., dust coming from the dedustifying means 19 can be fed back into the melter gasifier 10, namely via the duct 38'.

As the sponge iron impinges on the slanting wall 33 and slides along the same, it is slowed down, and there will still be enough time for the high temperature reigning in the combustion chamber 37 to actually effect an agglomeration. The formation of a combustion chamber 37 in accordance with the illustrated exemplary embodiment is not strictly necessary. There could also be provided a single plane slanting wall on which the fine material impinges, however, the combustion chamber has the advantage that it is possible to minimize the energy supply while still achieving efficient agglomeration or partial melting respectively of the fine particles of the sponge iron. Further, several slanting walls 33 could be provided in the dome 30 of the melter gasifier 10.

Carbon carriers, such as coal, are introduced via feed ducts 16 entering the region of the dome 30 of the melter gasifier 10 radially outside of the enveloping wall 33. Lumpy coal can also be charged to the melter gasifier 10 through the combustion chamber 37 formed by the enveloping wall 33, f.i. through a centrally arranged mouth of a further feed duct 16' for lumpy carbon carriers as well as optionally for prereduced iron carriers. By this arrangement of the feed ducts 16, 16' for the carbon carriers it is feasible to optimize the structure of the fluidized bed, so that the sponge iron will be distributed approximately evenly over the cross-section of the fluidized bed.

What is claimed is:

1. A melter gasifier (10) for the production of a metal melt which is at least partially reduced and contains a portion of fines, and of a reducing gas by gasification of coal, with feed ducts (17, 16, 9) for oxygen-containing gases, carbon carriers and the metal carriers running into said melter gasifier (10), which feed ducts (17) for oxygen-containing gases are arranged in the lower region of the melter gasifier (10), wherein at least one gas discharge duct (12) for reducing gas generated in the melter gasifier (10) departs from the melter gasifier and the melter gasifier (10) is provided with a tap (18) for the metal melt and for slag, characterized in that at least one feed duct (9) feeding the metal carriers is arranged in the region of a dome (30) terminating the melter gasifier (10) toward the top and that in the interior (31) of the melter gasifier (10) below the entry site of the feed duct (9) for the metal carriers a refractory slanting wall (33) is arranged that is inclined towards the vertical line and on which there impinge the metal carriers sinking downward due to gravitational forces, and that above the slanting wall (33) a heating means (38) is provided by which the area between the entry site of the feed duct (9) for the metal carriers and the slanting wall (33) may be heated.

2. A melter gasifier according to claim 1, characterized in that the slanting wall (33) is constructed as an enveloping wall (33) of a truncated cone or pyramid having an apex (34) that is directed downward, and that several feed ducts (9) for the metal carriers are provided in the dome (30) of the melter gasifier (10), all of them being arranged in the region located vertically above the enveloping wall (33) and being directed towards the inner surface of the enveloping wall (33).

3. A melter gasifier according to claim 2, characterized in that, further, several heating means (38) are provided above the enveloping wall (33).

4. A melter gasifier according to claim 3, characterized in that the heating means (38) are provided between the outlets of the feed ducts (9) for the metal carriers and the region where the enveloping wall (33) departs at the dome (30) of the melter gasifier (10).

5. A melter gasifier according to claim 2, characterized in that a feed duct (16') for lumpy carbon carriers is provided centrally in the dome (30) and is arranged above the lower opening (36) of the enveloping wall (33).

6. A melter gasifier according to claim 5, characterized in that, in addition, further feed ducts (16) for lumpy carbon carriers and optionally for pre-reduced iron carriers are provided outside of the region located vertically above the enveloping wall (33).

7. A plant for the production of metal melts from charging substances formed of ore and of fluxes and at least partially containing a portion of fines, characterized by at least two fluidized bed reactors (1 to 3) subsequently connected in series, wherein the ore is conducted from fluidized bed reactor (1) to fluidized bed reactor (2, 3) via conveying ducts (6) in one direction and reducing gas is conducted from fluidized bed reactor (3) to fluidized bed reactor (2, 1) via reducing-gas connecting ducts (13) in the opposite direction, and by a melter gasifier (10) according to claim 1, into which there runs a feed duct (9) conducting the reduction product from the fluidized bed reactor (3) arranged last in the direction of the ore flow and the gas discharge duct (12) of which runs into the fluidized bed reactor (3) arranged last in the direction of the ore flow.

8. A melter gasifier according to claim 1, characterized in that the region of the dome (30) terminating the melter gasifier (10) toward the top is the central region of the dome (30).

9. A melter gasifier according to claim 1, characterized in that the heating means (30) is a coal burner.

\* \* \* \* \*